United States Patent [19]
Hudson et al.

[11] Patent Number: 6,055,637
[45] Date of Patent: *Apr. 25, 2000

[54] SYSTEM AND METHOD FOR ACCESSING ENTERPRISE-WIDE RESOURCES BY PRESENTING TO THE RESOURCE A TEMPORARY CREDENTIAL

[75] Inventors: Jerome D. Hudson, Flushing, Mich.; Jean-Paul Champagne, Evry, France; Mary A. Galindo, Dallas, Tex.; Cynthia M. K. Hickerson, Bluemont, Va.; Donna R. Hickman, White Lake, Mich.; Robert P. Lockhart; Nancy B. Saddler, both of Plano, Tex.; Patricia A. Stange, Rochester Hills, Mich.

[73] Assignee: Electronic Data Systems Corporation, Plano, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/722,841

[22] Filed: Sep. 27, 1996

[51] Int. Cl.[7] ...................................................... G06F 15/16
[52] U.S. Cl. ............................................ 713/201; 709/225
[58] Field of Search .............................. 395/186, 187.01, 395/188.01; 380/4; 713/200–202; 709/225

[56] References Cited

U.S. PATENT DOCUMENTS

| | | | |
|---|---|---|---|
| 5,241,594 | 8/1993 | Kung .............................................. 380/4 |
| 5,274,824 | 12/1993 | Howarth ....................................... 380/4 |
| 5,315,657 | 5/1994 | Abadi et al. ............................... 380/25 |
| 5,455,953 | 10/1995 | Russell ...................................... 395/739 |
| 5,506,961 | 4/1996 | Carlson et al. ........................... 395/186 |
| 5,534,855 | 7/1996 | Shockley et al. ...................... 340/825.3 |
| 5,542,046 | 7/1996 | Carlson et al. ........................... 395/186 |
| 5,649,099 | 7/1997 | Theimer et al. ..................... 395/187.01 |
| 5,659,616 | 8/1997 | Sudia ......................................... 380/23 |
| 5,684,950 | 11/1997 | Dare et al. .......................... 395/187.01 |
| 5,748,890 | 5/1998 | Goldberg et al. ................... 395/188.01 |
| 5,757,920 | 5/1998 | Misra et al. ............................... 380/25 |
| 5,815,574 | 9/1998 | Fortinsky ................................... 380/25 |
| 5,815,665 | 9/1998 | Teper et al. ............................. 709/239 |
| 5,818,936 | 10/1998 | Mashayekhi ............................. 380/25 |
| 5,841,970 | 11/1998 | Tabuki .................................... 713/201 |
| 5,864,665 | 1/1999 | Tran ....................................... 713/201 |
| 5,899,952 | 1/1999 | Hunnicutt et al. ...................... 709/229 |
| 5,911,143 | 6/1999 | Deinhart et al. ........................ 707/103 |

OTHER PUBLICATIONS

Unix System v: Release 4 Administration, 2nd., pp. 189–191, 1994.

Samuel I. Schaen and Brian W. McKenney, "Network Auditing: Issues and Recomendations", IEEE, pp. 66–79, Dec. 6, 1991.

Steiner, Neuman and Schiller, *Kerberos: An Authentication Service for Open Network Systems*, Project Athena, Cambridge, Massachusetts, Jan. 12, 1988.

*Understanding Network Directory Services, Statement of Direction*, Banyan Systems Inc., 1992.

Lunt, Steven J., cc:Mail re: *Kerberized ftp with encryption option available*, Jun. 2, 1993.

Kerberos Presentation .

Murray, WIliam H., Token Talk, *Infosecurity News*, Jul./Aug. 1996.

(List continued on next page.)

*Primary Examiner*—Zarni Maung
*Assistant Examiner*—Andrew Caldwell
*Attorney, Agent, or Firm*—L. Joy Griebenow; Baker & Botts L.L.P.

[57] ABSTRACT

A resource access control system and method (50) for a corporate enterprise includes a security administrator (60, 62) in communication with a plurality of users (90), each of the users (90) having an assigned role and a unique user identifier. A temporary credential token (52) is generated correlative to the assigned role of the user by the security administrator (62) as the user logs on by entering the assigned unique user identifier and indicates a desire to access a resource (56). The temporary credential token (52) is communicated to the resource (56) and any subsequent resources (56) to allow access by the user (90), and deleted as the user (90) terminates the session.

22 Claims, 4 Drawing Sheets

OTHER PUBLICATIONS

Sandhu, Coyne, Feinstein and Youman, Role–Based Access Control Models, *Computer* magazine, Feb. 1996.

Ferraiolo, Cugini, Kuhn, Role–Based Access Control (RBAC): Features and Motivations, 11th Annual Computer Security Application Proceedings 1995.

Stephenson, Peter, Enterprise Security Solutions?, *Infosecurity News,* Jul./Aug. 1996.

Conorich, Douglas G., Managing Security in a Multiplatform Environment, *Information Systems Security,* vol. 5, No. 2, Summer 1996.

SYSTEM AND METHOD FOR ACCESSING ENTERPRISE-WIDE RESOURCES BY PRESENTING TO THE RESOURCE A TEMPORARY CREDENTIAL

TECHNICAL FIELD OF THE INVENTION

This invention is related in general to the field of computer software systems. More particularly, the invention is related to system and method for enterprise-wide resource access control.

BACKGROUND OF THE INVENTION

FIG. 1 illustrates a typical problem encountered in a resource security system employed by corporate entities and organizations today. Access to resources 10 are provided to users via a number of interactive devices 12, including computer terminals, workstations, computers which are coupled to a network 14 or in communication therewith via a modem. Resources 10 may include mainframe computers 16, operating systems 18, other networks 20, computer platforms 22, other resources 24 and databases 26. Each of these interactive devices and resources may employ its own security package 30 to ensure that only the users with the proper credentials may access it. Therefore, to provide a user access to five resources, for example, the resource administrators of the five resources must separately authorize clearance to the user by providing him/her with an identification number or character string and a password. Further, each resource security package must maintain an access database of all of its authorized user identifications and passwords.

As a result, a user's typical log on session would require the user to enter his/her user identifier(s) and password(s) several times to gain access to a number of different resources. Each resource is required to independently authenticate the user's identifier and password before entry is granted. If the user logs off a resource but later desires access to the same resource again during the same session, he/she must reenter the user identifier and password to regain entry.

When the user changes responsibility, function or status with the company, the respective resource administrators must be individually notified to update the access database of each resource. However, because the access databases may not be updated (by the individual resource administrators) to reflect the change in personnel, the integrity of the entire system may be compromised.

SUMMARY OF THE INVENTION

Accordingly, there is a need for a system and method which provide role-based access control for resources of an entire corporate entity which eliminate or substantially reduce the disadvantages associated with prior security systems and packages.

In one aspect of the invention, a resource access control system for a corporate enterprise includes many security administrators in communication with a plurality of users, each of the users having one or more assigned roles and a unique user identifier. A database is coupled to the security administrator for storing the users' assigned roles and user identifiers. A temporary credential token is generated correlative to the assigned role(s) of a user by the security administrator as the user logs on by entering the assigned unique user identifier and indicating a desire to access a resource. The temporary credential token is communicated to the resource to allow access by the user, and deleted as the user logs off the resource.

In another aspect of the invention, a resource access control method provides for the steps of first assigning one or more roles to a user, and defining at least one resource accessible by the user having the role. A temporary credential token is then generated when the user begins a session and requests access to the at least one resource, presenting the temporary credential token to the at least one resource to allow entry by the user, and terminating the temporary credential token when the user terminates the session.

In yet another aspect of the invention, a resource access control method provides for the steps of beginning a session and logging on to a first resource by entering a user identifier and password, for example. The user identifier and password are then authenticated, and a role corresponding to the user identifier is determined and a temporary credential token is generated in response to the authentication and role recognition. The temporary credential token is presented to the first resource to gain entry thereto and further presented to subsequent resources for authentication and access thereto. The temporary credential token is deleted when the session is terminated.

BRIEF DESCRIPTION OF THE DRAWINGS

For a better understanding of the present invention, reference may be made to the accompanying drawings, in which.

DETAILED DESCRIPTION OF THE INVENTION

Figure 1:
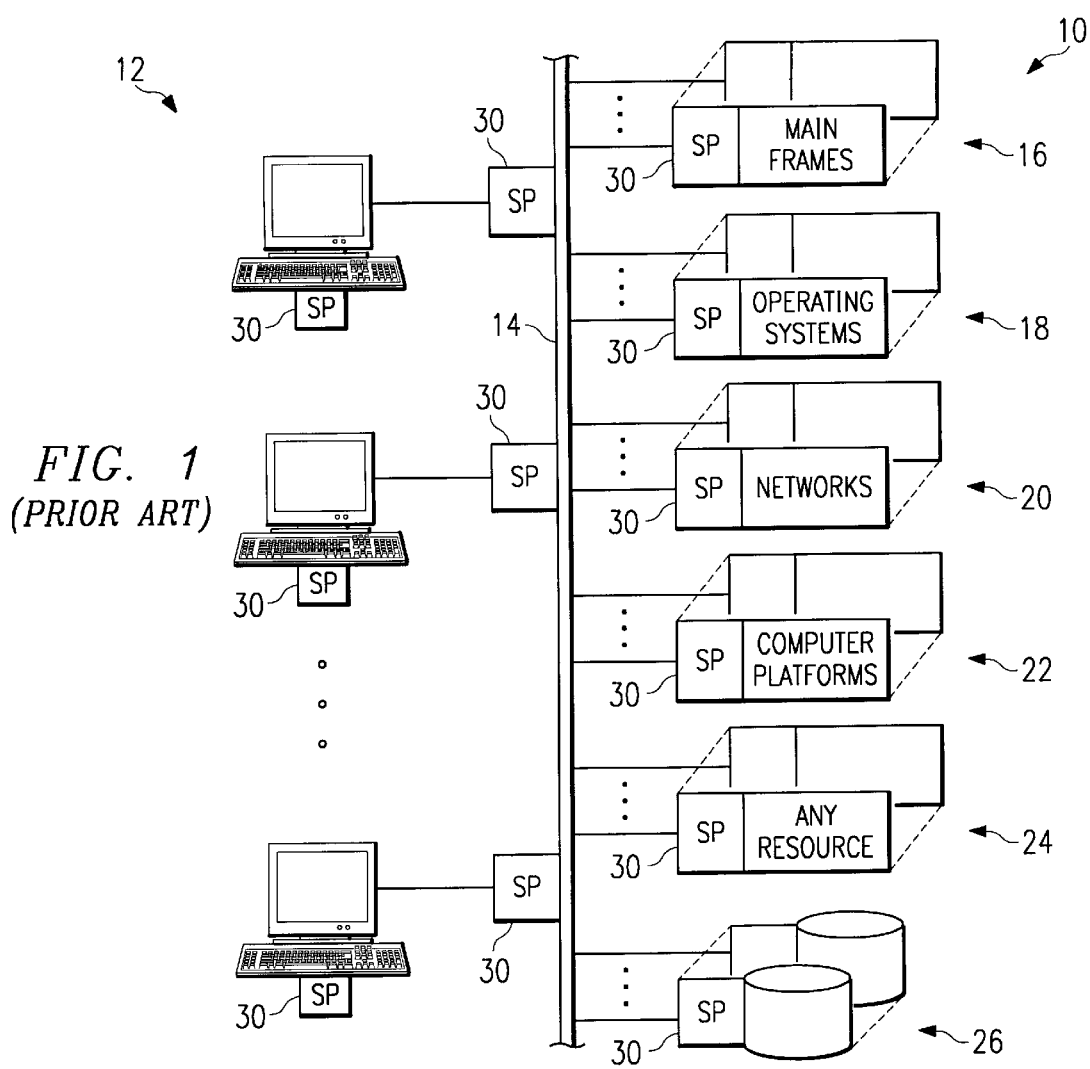
FIG. 1 is an exemplary block diagram of a conventional implementation of resource security within an organization.
Figure 2:
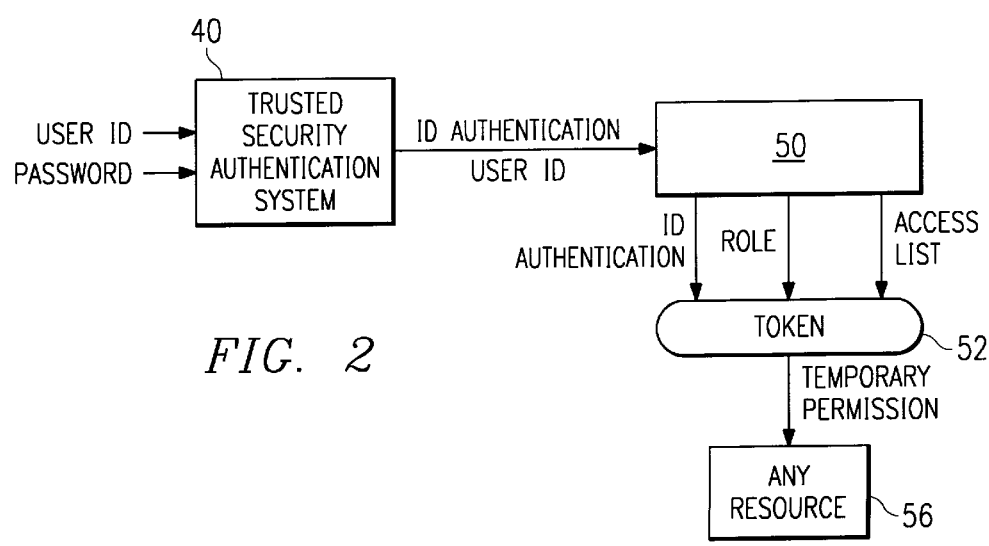
FIG. 2 is a simplified block diagram of an exemplary resource access control process according to the teachings of the present invention.
Figure 3:
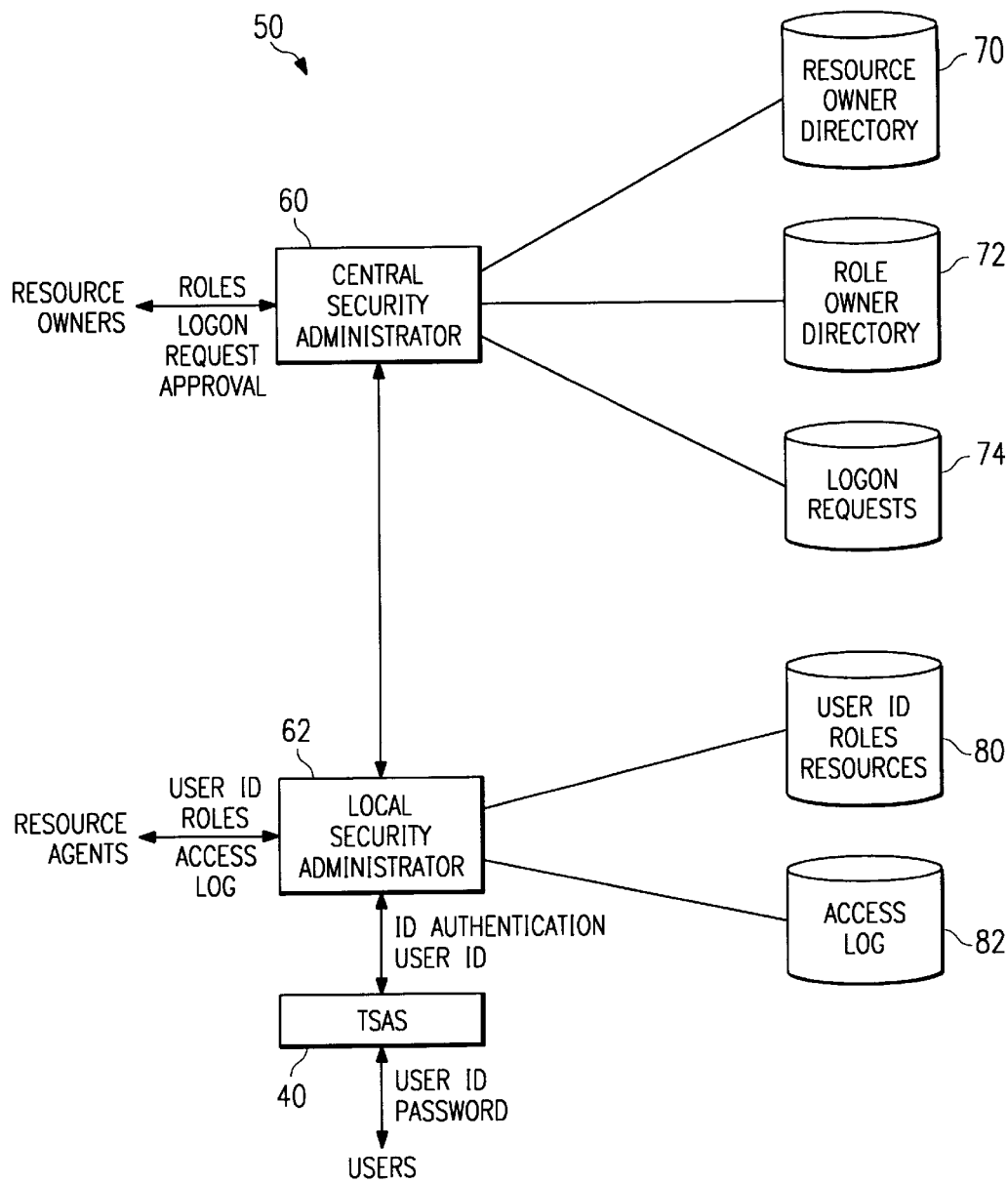
FIG. 3 is a simplified block diagram of an exemplary embodiment of a resource access control system constructed according to the teachings of the present invention.

The preferred embodiment(s) of the present invention is (are) illustrated in FIGS. 2–4, like reference numerals being used to refer to like and corresponding parts of the various drawings.

Referring to FIG. 2, a simplified block diagram of an exemplary process for securing access to any resource according to the teachings of the present invention is shown. A user logs on and enters his/her unique user identifier (ID), password, and/or associated information at an interactive device such as a computer terminal, workstation, and computer (not shown). The user identifier and password are passed to a trusted security authentication system 40, which may check its database (not explicitly shown), validate the user's identity, and pass authenticated user information, including the user identifier, to a resource access control system 50 constructed according to the teachings of the present invention. Although the use of a password is currently the primary authentication method, this invention can interact with any authentication method. The authenticated user information passed from trusted security authentication system 40 and resource access control system 50 may be protected by encryption. System 50 receives the user information and generates a temporary user credential token 52, which contains information such as the user's identifier authentication information, the user's role(s), and the user's access list. This token 52 represents authorization for the user to access all the resources 56 listed in the access list. Thus, token 52 is presented to each resource 56 as the user attempts to log on or otherwise gain access.

Accordingly, the resource access control system and method of the present invention are role-based, i.e., the user is authorized to access one or more resources based on the role(s) assigned to the user, not on the individual user. A role is defined as a job function within the organization that describes the authority and responsibility conferred on a user assigned to the role or an otherwise desired title for the user. A default role may be used to provide an employee the basic clearance to limited resources without an explicit assignment. Roles may include, for example, System Analyst I, Financial Advisor, Supervisor, Test Engineer, System Administrator, etc. Associated with each defined role are the resources needed to perform the job and the degree of authorized access for each resource. A resource is anything that is used or consumed while performing a function, and can be time, information, objects, or computing resources.

More specifically, token 52 preferably includes subject information, object information, and security rules permissions with the user's role(s). Subject information are information on active entities or subjects, such as users, applications, network nodes, that cause data to flow among objects, alters an object, or changes the system state. It follows then that objects are passive entities, such as data files, records, programs, that contain information and are acted upon by processes initiated by subjects. Each subject is preferably identified by a unique identifier, which is used as a key for accessing subject information. Subject information may include validation information, authorization information, and general information. Validation information is used to verify the identity of a subject and may take different forms, such as a password, fingerprint, voice spectrum, signature, and other unique properties of the user. Validation information is preferably stored in an encrypted format. Authorization information is used to determine whether the subject is authorized to access the selected object. Authorization information may define organizational groups, functional groups, or roles. Lastly, general information may include additional data on the user, such as name, phone number, work location, e-mail address. General information is typically not used for the implementation of security or resource access control but is mainly used for problem resolution and application inquiries.

Token 52 may include object information as well. Object information identifies the object owner, classification level, and object attributes. The owner of an object determines who is authorized to access the object and the type of access permitted, i.e., read, update, or delete. The classification level is the degree of protection an object is given, as defined by the organization. The classification level may control the security action performed when the object is accessed, stored, or moved. Object attributes may be used to identify optional security control measures, such as encryption prior to network transmission.

Token 52 may also include security rules or temporary access permission, which may include configuration parameters and security controls. Configuration parameters may include global parameters that apply to an entire organization and local parameters that apply to a single domain, a user group, or a single user. A domain is a grouping defined by function, physical or logical location, resources, and other factors that cause resources to be organized in a particular way. Security controls may govern access to an object and identify actions that may be performed based on the type of audit records. Further, security controls may also describe the type of security language translation needed to communicate with security packages employed by the object. Constructed in this manner, there is no need to write and store security controls for each individual user that would be stored and remain in the language of the security package in its database. Instead, resource access control system and method of the present invention communicate with the security package of a resource only when the user desires access thereto and dynamically generate the security rule, or temporary access permission for the user's access for each session. The security permission is removed at the end of the user's session, so that there is no update required when that user no longer needs access to that particular resource or change responsibility, function, or status with the company. The security permission is also removed when the session did not end in a normal manner to prevent unauthorized access.

Referring to FIG. 3, a more detailed block diagram of resource access control system 50 is shown. System 50 includes a central security administrator 60 and one or more local security administrator 62 coupled thereto. Resource owners, defined as those users who have ownership responsibility for a specific resource, maintain and provide central security administrator 60 a list of roles that are permitted to access the resource and the degree of access authorized for each role. Central security administrator 60 preferably stores and maintains a number of databases: resource owner directory 70, role owner directory 72, audit database 74, and any other related data. Resource owner directory 70 maintains a listing of resource owners and the resources they own. Role owner directory 72 maintains a listing of roles and their owners. A resource owner is a person who is identified to be responsible for one or more resources. Role owner directory 72 is used by central security administrator 60 to ensure the names of roles between groups do not overlap, and that each role is unique. Special permission may be granted to a group requesting the use of a role definition owned by another group as coordinated by central security administrator 60. Central security administrator 60 also directs and forwards requests for accessing resource to the owner of the requested resource to seek approval. Further, resource owners are able to access audit database 74 and/or to specify and generate reports from database 74 that enable them to determine who has attempted to gain entry to their resources and other information related to user access transactions.

Local security administrator 62 is accessible by resource agents, who are defined as those persons who act on behalf of users by submitting requests for resource access. Typically, resource agents are members of a user group or project team, who make resource access requests for other members of the group. Local security administrator 62 preferably stores and maintains a database 80 of user identifiers, roles, and corresponding resource permissions, and a database 82 for recording resource access histories. Local security administrator 62 is also in communication with trusted security authentication system (TSAS) 40 to receive the user identifier and authentication information. Central security administrator 60 and local security administrator 62 may be co-located on the same computing platform.

Figure 4A:
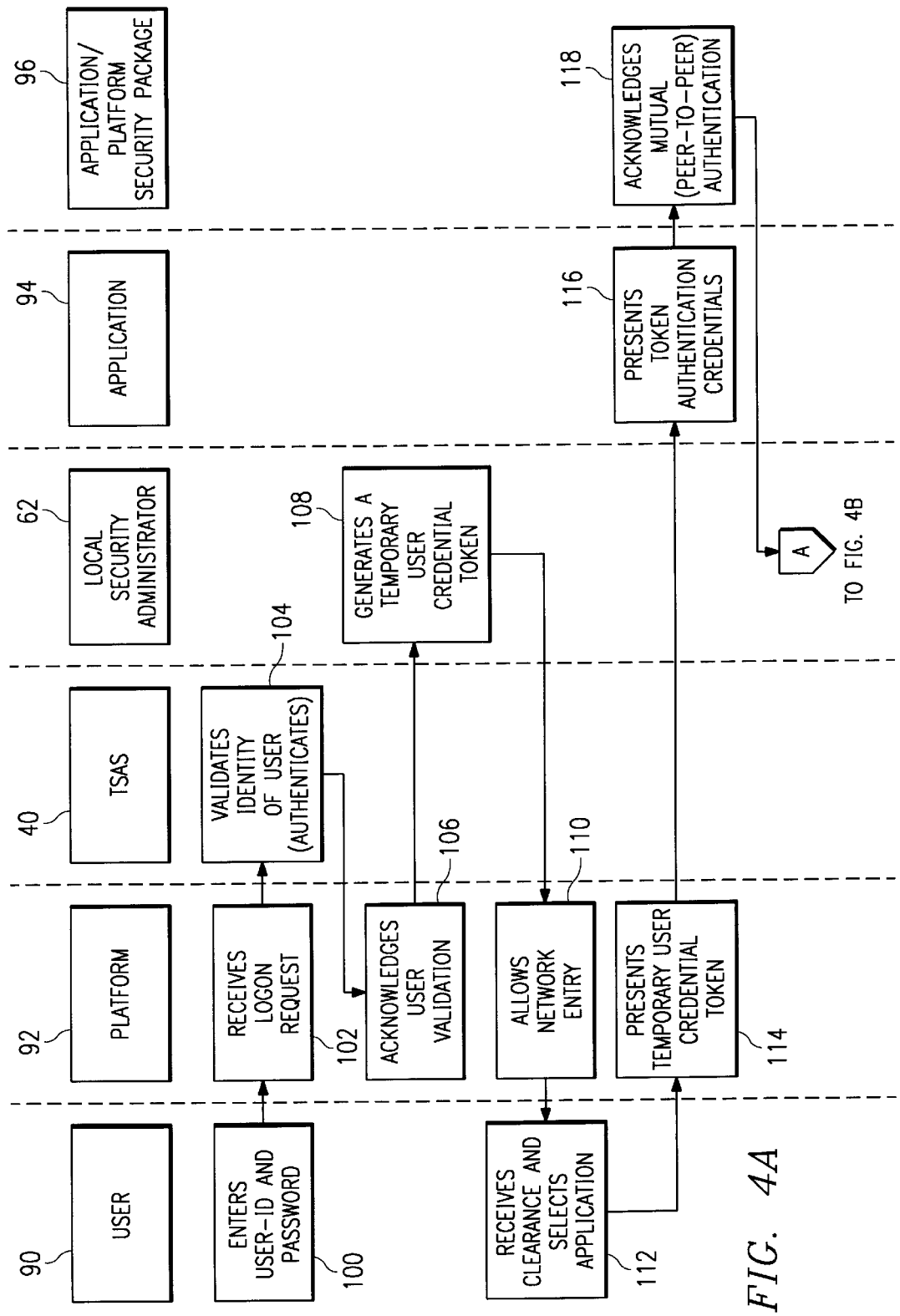
FIGS. 4A and 4B show a more detailed block diagram of exemplary log on and log off processes and associated access control measures according to the teachings of the present invention.
Figure 4B:
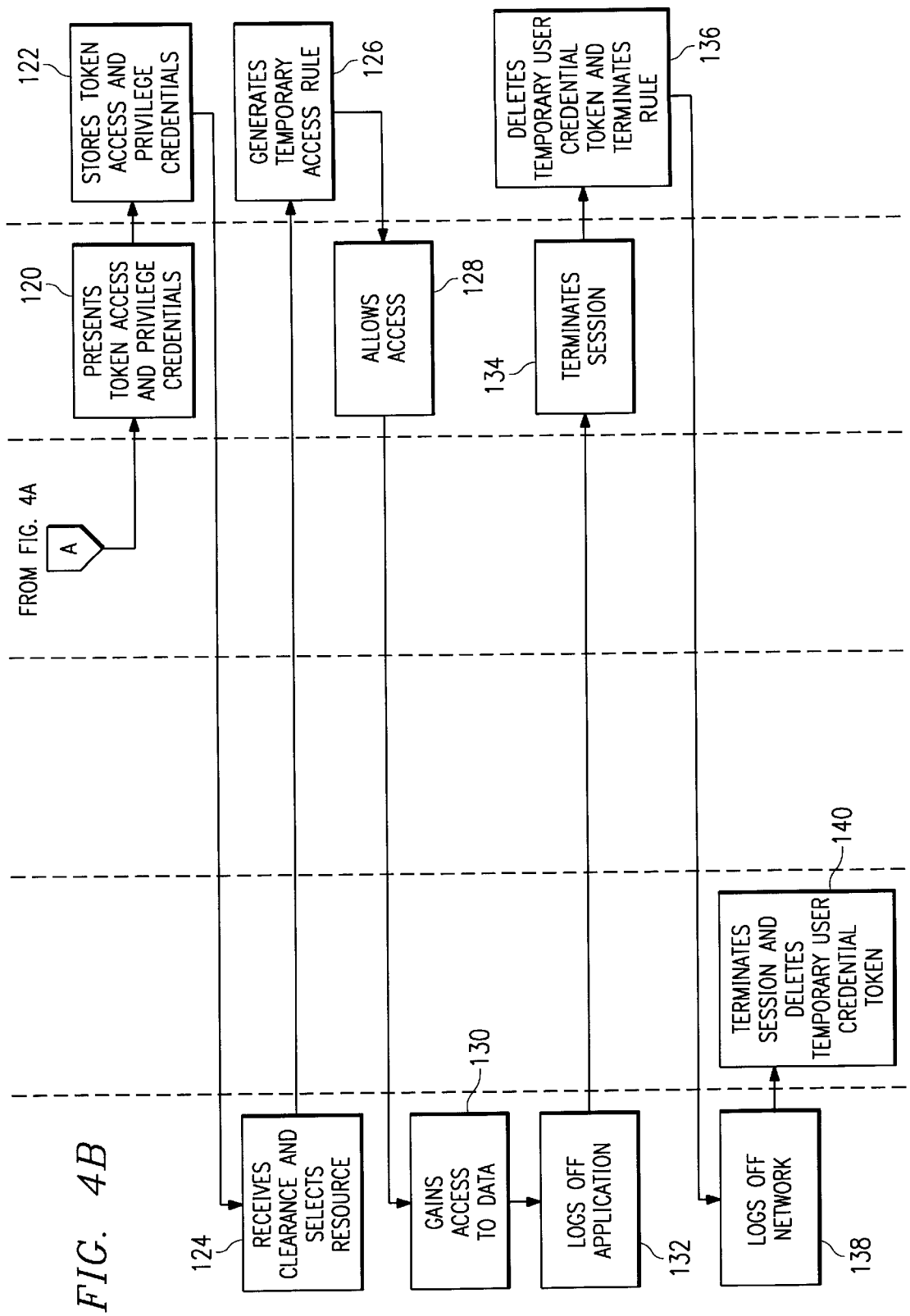

Referring to FIGS. 4A and 4B, a more detailed exemplary process flow diagram of the invention is shown. Across the top of the diagram, the exemplary locations of the process steps taking place or the actor performing the process steps are identified, including a user 90, a platform 92, trusted security authentication system 40, local security administrator 62, an application program 94, and an application or platform security package 96. The exemplary process steps are sequentially illustrated and described below, where the alignment of each process step with the place or actor in the top row is indicative of a possible location of the step carried out or a possible actor carrying out the step. It is important to emphasize that although the process steps and the location at which they take place are shown explicitly, the invention is not so limited. FIGS. 4A and 4B provide one embodiment of the process in which a role-based temporary access token and permission are generated and used.

Beginning with block 100, user 90 first enters a unique user identifier, a password, and/or any other authentication information at a computer terminal or some other form of data entry equipment. Authentication information may include fingerprints, retinal data, smart card data, and any unique information associated with the user. Platform 92 receives the user identifier and password in block 102, which are indicative of a request to log onto the platform, and passes them on to TSAS 40. TSAS 40 validates the identity of the user, as shown in block 104, and provides an acknowledgment of the authentication to platform 92, as shown in block 106. Platform 92 then provides this information to local security administrator 62, which generates a temporary user credential token, as shown in block 108. The token is presented to platform 92, which gives user 90 the permission to gain access to a network, for example, as shown in block 110. Preferably, an informative screen indicative of the security clearance is displayed at the computer terminal in addition to a list of resources user 90 may now access. User 90 may then select a resource from the list, such as an application program, as shown in block 112.

Platform 92, upon determining the user's selection, presents the temporary user credential token to selected application program 94, as shown in block 114. Application program 94 in turn presents authentication information contained in the token to security package 96 of application program 94, as shown in block 116. Security package 96 performs mutual authentication by verifying the authentication information contained in the token, as shown in block 118. It is important to distinguish this step from other conventional systems in which user identifier and password are again authenticated. Here, the token is only examined to ensure it contains valid information. In block 120, application program 94 then presents the token, which includes the privilege credentials of user 90, to security package 96. In block 122, security package 96 stores the token for the life of the session, and subsequently issues clearance to user 90. A screen displaying a list of application resources now available to user 90 may then be displayed to allow user 90 to make a further selection, as shown in block 124. The resources may include particular files and databases, for example. Upon receiving the user's selection, security package 96 generates a temporary access permission guarding the user's access of the selected resource, as shown in block 126, and application program 94 allows the user's access to the selected resource. The user is able to read, update, or delete data contained in the selected resource, depending on what actions are allowed by the temporary access permission, as shown in blocks 128–130.

When user 90 logs off from application program 94 at the end of the session, application program 94 terminates the session, and security package 96 deletes the temporary user credential token and also terminates the temporary access permission, as shown in blocks 132–136. User 90 then logs off the network in block 138, and platform 92 then deletes the temporary user credential token and terminates the session in block 140. It may be seen from the foregoing that user 90 may switch to another application and come back to the first application during the same session without its security package 96 having to re-authenticate the user's credentials. Re-authentication is not necessary as long as the security package of the first application program cached the user's credentials when the user first gained access thereto.

Constructed and operating in this manner, resource access control system 50 provides a temporary access token according to the role the user is assigned. The same token is used to gain access to all the resources at the organization, including networks, mainframe computers, computing platforms, application programs, databases, files, etc. The token, in effect, travels with the user to the various security packages of the resources he/she wishes to gain access. Therefore, the user is only required to enter one set of user identifier and password even when he/she may wish to access, for example, ten resources during a single session. Because resource access control system 50 grants entry to resources based on a user's role and the various resources need not permanently store information associated with all the users, user information may be updated quickly and efficiently at local security administrator 62.

Although the present invention and its advantages have been described in detail, it should be understood that various changes, substitutions and alterations can be made therein without departing from the spirit and scope of the invention as defined by the appended claims.

What is claimed is:

1. A resource access control method, comprising the steps of:

assigning at least one role to a user;

generating a temporary credential token when said user begins a session and requests access to at least one resource based on said at least one role assigned to said user, the temporary credential token allowing said user to access any resource within the enterprise based on the assigned role of the user, wherein said temporary credential token includes role information specifying at least one of said assigned user roles and resource information comprising a list of accessible resources corresponding to said assigned user role;

presenting said temporary credential token to said at least one resource to allow entry by said user;

generating a temporary access permission by said at least one resource in response to said at least one resource receiving said temporary credential token, the temporary access permission permitting said user access to said at least one resource;

terminating said temporary credential token and said temporary access permission to terminate said user's access to said at least one resource when said user terminates the session.

2. The method, as set forth in claim 1, further comprising the steps of:

assigning a user identifier to said user; and receiving said user identifier from said user and authenticating said user identifier prior to generating said temporary credential token.

3. The method, as set forth in claim 1, further comprising the steps of:

assigning a user identifier and a password to said user; and receiving said user identifier and password from said user and authenticating said user identifier and password prior to generating said temporary credential token.

4. The method, as set forth in claim 1, further comprising the steps of:

presenting said temporary credential token to a second resource when said user indicates a desire to access said second resource; and said second resource authenticating said temporary credential token and permitting said user access.

5. An enterprise-wide resource access control system, comprising:

a security administrator in communication with a plurality of users, each of said users having at least one assigned role and a unique user identifier, said assigned role defining a job function of a user;

a database coupled to said security administrator for storing said plurality of users' assigned roles, unique user identifiers, and a resource access list identifying all enterprise-wide resources that may be accessed by the user based on the assigned role of the user;

a temporary credential token being generated in response to said at least one assigned role of a user by said security administrator as said user logs on to a first resource by entering said assigned unique user identifier, said temporary credential token being communicated to said first resource to allow said user to access any resource within the enterprise that is identified in the resource access list, said temporary credential token being deleted as said user logs off said resource, wherein said temporary credential token includes role information specifying at least one of said assigned user roles and resource information comprising the corresponding accessible resources from the resource access list; and a temporary access permission being generated by a second resource in response to receiving and verifying said temporary credential token, said temporary credential token being presented to said second resource in response to said user requesting access to said second resource, said second resource existing in the resource access list, said temporary access permission being deleted as said user terminates a session with said second resource.

6. The system, as set forth in claim 5, wherein the temporary credential token comprises information on said user.

7. The system, as set forth in claim 6, wherein said user information comprises a password entered by said user during log on.

8. The system, as set forth in claim 6, wherein said resource information comprises an identity of ownership of said resource.

9. The system, as set forth in claim 6, wherein said resource in formation comprises a classification level of said resource.

10. The system, as set forth in claim 5, wherein said security administrator comprises:

a local security administrator coupled to a trusted security authentication system, which receives and authenticates said user's unique user identifier and a password, said security administrator then generates said temporary credential token after said authentication; and a central security administrator coupled to said local security administrator for providing a centralized management of role ownership and resource ownership.

11. The system, as set forth in claim 10, wherein said database further comprises:

a resource owner directory coupled to said central security administrator; and a role owner directory coupled to said central security administrator.

12. The system, as set forth in claim 10, wherein said database further comprises a unique user identifier and corresponding assigned role directory coupled to said local security administrator.

13. The system, as set forth in claim 10, wherein said database further comprises information necessary for audit and accountability purposes.

14. The system, as set forth in claim 10, wherein said database further comprises a log of resources accessed by said user coupled to said local security administrator.

15. A resource access control method, comprising the steps of:

beginning a session and logging on to a first resource by entering a user identifier and password;

authenticating said user identifier and password;

recognizing at least one role corresponding to said user identifier and generating a temporary credential token in response to said authentication and role recognition, said temporary credential token, wherein said temporary credential token includes role information specifying at least one of said assigned user roles and resource information comprising a list of accessible resources corresponding to said assigned user role;

presenting said temporary credential token to said first resource;

gaining entry to said first resource in response to receiving said temporary credential token;

selecting a second resource; presenting said temporary credential token to said second resource;

generating a temporary access permission by said second resource upon presentation and verification of said temporary credential token; gaining entry to said second resource in response to the second resource generating a temporary access permission; and terminating said temporary credential token and said temporary access permission when said session is terminated.

16. The method, as set forth in claim 15, further comprising the step of generating a temporary access permission by a security package of said second resource upon presentation and authentication of said temporary credential token thereto.

17. The method, as set forth in claim 15, further comprising the step of storing all user identifiers, and corresponding roles in a database.

18. The method, as set forth in claim 15, further comprising the step of submitting a request to a resource owner for accessing a particular resource by a user having an assigned role.

19. The method, as set forth in claim 18, further comprising the step of defining a role having access to a set of resources.

20. The method, as set forth in claim 19, further comprising the step of assigning a defined role to a user.

21. The method, as set forth in claim 20, further comprising the step of assigning said user identifier to said user.

22. The method, as set forth in claim 15, further comprising the step of temporarily storing said temporary credential token by said first and second resources until termination of said session.

* * * * *